(12) United States Patent
Black-Ziegelbein et al.

(10) Patent No.: US 7,788,671 B2
(45) Date of Patent: Aug. 31, 2010

(54) ON-DEMAND APPLICATION RESOURCE ALLOCATION THROUGH DYNAMIC RECONFIGURATION OF APPLICATION CLUSTER SIZE AND PLACEMENT

(75) Inventors: Elizabeth A. Black-Ziegelbein, Austin, TX (US); Gennaro A. Cuomo, Cary, NC (US); Brian K. Martin, Cary, NC (US); Giovanni Pacifici, New York, NY (US); Michael Spreitzer, Croton-On-Hudson, NY (US); Malgorzata Steinder, Fort Lee, NJ (US); Asser N. Tantawi, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 1625 days.

(21) Appl. No.: 10/978,944

(22) Filed: Nov. 1, 2004

(65) Prior Publication Data

US 2006/0095917 A1 May 4, 2006

(51) Int. Cl.
*G06F 9/46* (2006.01)
*G06F 15/177* (2006.01)
*G06F 15/173* (2006.01)
(52) U.S. Cl. .................... 718/105; 718/104; 709/220; 709/221; 709/224; 709/225
(58) Field of Classification Search ............ 718/1–108; 709/205, 100, 220, 221, 224, 225; 708/102, 708/104, 105, 106
See application file for complete search history.

(56) References Cited

U.S. PATENT DOCUMENTS 6,327,622 B1   12/2001   Jindal et al.
6,351,775 B1   2/2002    Yu
6,366,945 B1   4/2002    Fong et al.

(Continued)

FOREIGN PATENT DOCUMENTS

WO     WO 0022780 A1   *   4/2000

(Continued)

OTHER PUBLICATIONS

Lodi et al. "QoS Clustering of Application Servers", Oct. 17, 2004, Proceedings of the 1st IEEE workshop on quality of service on application servers, pp. 1-6.*

(Continued)

*Primary Examiner*—Meng-Ai An
*Assistant Examiner*—Willy W Huaracha
(74) *Attorney, Agent, or Firm*—Jeanine S. Ray-Yarietts, Esq.; Steven M. Greenberg, Esq.; Carey Rodriguez Greenberg & Paul LLP

(57) ABSTRACT

A method, system and apparatus for on-demand application resource allocation. In accordance with the method of the invention, an anticipated workload can be compared to a measured capacity for an application cluster in one or more server computing nodes in a server farm. If the measured capacity warrants a re-configuration of the application clusters, a new placement can be computed for application server instances in individual ones of the server computing nodes. Subsequently, the new placement can be applied to the server computing nodes in the server farm. In this regard, the applying step can include starting and stopping selected ones of the application server instances in different ones of the server computing nodes to effectuate the new placement.

21 Claims, 2 Drawing Sheets

U.S. PATENT DOCUMENTS

| | | | |
|---|---|---|---|
| 6,385,638 | B1 | 5/2002 | Baker-Harvey |
| 6,711,607 | B1 | 3/2004 | Goyal |
| 6,718,387 | B1 | 4/2004 | Gupta et al. |
| 6,816,905 | B1 | 11/2004 | Sheets et al. |
| 7,065,764 | B1 * | 6/2006 | Prael et al. .................. 718/102 |
| 7,287,121 | B2 * | 10/2007 | Horn et al. .................. 711/114 |
| 7,577,091 | B2 * | 8/2009 | Antal et al. .................. 370/229 |
| 2002/0120744 | A1 | 8/2002 | Chellis et al. |
| 2003/0028642 | A1 | 2/2003 | Agarwal et al. |
| 2003/0105868 | A1 | 6/2003 | Kimbrel et al. |
| 2003/0163734 | A1 * | 8/2003 | Yoshimura et al. ........... 713/201 |
| 2003/0177160 | A1 * | 9/2003 | Chiu et al. .................. 709/100 |
| 2004/0054882 | A1 * | 3/2004 | Borneo et al. ............... 712/300 |
| 2004/0254984 | A1 * | 12/2004 | Dinker ....................... 709/205 |
| 2005/0060389 | A1 * | 3/2005 | Cherkasova et al. ......... 709/220 |
| 2005/0138170 | A1 * | 6/2005 | Cherkasova et al. ......... 709/225 |
| 2005/0235286 | A1 * | 10/2005 | Ballew et al. ............... 718/100 |

OTHER PUBLICATIONS

Chase et al. "Dynamic Virtual Clusters in a Grid Site Manager", 2003, Proceedings of the 12th IEEE International Symposium on High Performance Distributed Computing, pp. 1-11.*

Moore et al. "Managing Mixed-Use Clussters with Cluster-on-Demand", Internet Systems and Storage Group Software Architecture for Internet-scale computing, pp. 1-12.*

Jian et al. "SODA: A service-on-demand architecture for application service hosting utilitiy platforms". Proceedings 12th IEEE International Symposium on High Performance Distributed Computing 2003; Jun. 22-24, 2003, pp. 174-183.*

Herness, High and McGee: "WebSphere Application Server: A foundation for on demand computing" IBM Systems Journal, vol. 43, No. 2, Apr. 30, 2004, pp. 213-237.

G. Lodi, F. Panzieri: "QoS-aware Clustering of Application Servers" Proceedings of the 1ST 1EEE Workshop on Quality of Service for Application Servers, in Conjunction With The 23RD Int'l Symposium on Reliable Distributed Systems (SRDS 2004), Oct. 17, 2004, p. 1-6.

Crawford C. H. et al, "eModel: Addressing the Need for a Flexible Modeling Framework in Autonomic Computing," Modeling, Analysis and Simulation of Computer and Telecommunications Systems, 2002. Mascots 2002. Proceedings. 10TH 1EEE International Symposium on Oct. 11-16, 2002, p. 203-208.

* cited by examiner

ON-DEMAND APPLICATION RESOURCE ALLOCATION THROUGH DYNAMIC RECONFIGURATION OF APPLICATION CLUSTER SIZE AND PLACEMENT

BACKGROUND OF THE INVENTION

1. Statement of the Technical Field

The present invention relates to server farm management and more particularly to the allocation of application cluster management in a server farm.

2. Description of the Related Art

Application server clusters ("application clusters") have become common in the field of high-availability and high-performance computing. Application cluster-based systems exhibit three important and fundamental characteristics or properties: reliability, availability and serviceability. Each of these features are of paramount importance when designing the a robust clustered system. Generally, a clustered system consists of multiple application server instances grouped together in a server farm of one or more server computing nodes that are connected over high-speed network communicative linkages. Each application server process in the application cluster can enjoy access to memory, possibly disk space and the facilities of a host operating system.

Generally, each server computing node can host only a few application server instances. The application server instances themselves can operate in a request/response paradigm. Accordingly, request messages for a particular application necessary are split among multiple application server instances of the application cluster. Accordingly, an aspect to application cluster management can include the automatic instantiation of application server instances in one or more application clusters in the server farm to allow the server farm to dynamically adjust the number of application server instances as the load for the server farm fluctuates.

When distributed applications involve the use of different application servers, the size of an application cluster can directly impact the amount of load that the application cluster can sustain without performance degradation. In this regard, when the size of an application cluster is not sufficient to service an offered load, end users can experience performance degradation or failures which ultimately can result in the violation of a service level agreement (SLA). Today, to avoid SLA violations, application providers overprovision the number of application server instances disposed among application clusters to handle peak load. Notwithstanding, this strategy can produce poor resource utilization during normal operating conditions.

Dynamic allocation strategies can alleviate the problem of poor resource utilization by automatically reallocating application server instances servicing an application based upon a contemporaneously experienced load and the objectives of an SLA. Dynamic allocation techniques generally assign an application to operate within the confines of an application cluster. Correspondingly, application server instances can be reallocated among application clusters based upon an offered load. Still, dynamic allocation strategies are not without several limitations.

Specifically, when only a single application is assigned to an application cluster at any given time, the granularity of resource allocation can be course in nature and wasteful when the demands of an application are not sufficient to warrant the utilization of an entire application cluster. By comparison, when more than one application is assigned to an application cluster, all applications in the application cluster must execute concurrently. The concurrent operation of the applications, however, limits the number of applications assigned to the application cluster by the memory capacity of the smallest application server in the cluster.

Once again, wasted server capacity can result as an application must execute on all application servers in the application cluster even if the workload could be satisfied by a subset of the application servers in the application cluster. Typically, however, only a few applications execute in an application server at any time. Therefore, regardless of the number of application servers in the application cluster, only a few applications can be served by the application cluster.

Notably, in the process of application server re-allocation from one application to the next, an old, no longer desirous application first must be uninstalled from the application server. Subsequently, the application server must be reconfigured and, in many circumstances, the underlying network of application clusters also must be reconfigured. Only then can a new application be installed to the application server. This reconfiguration process can be time-consuming and therefore, cannot be performed frequently. Consequently, workload changes in a server farm can produce a lower than acceptable responsiveness and, once again, the terms of an SLA can become breached.

SUMMARY OF THE INVENTION

The present invention addresses the deficiencies of the art in respect to server farm management and provides a novel and non-obvious method, system and apparatus for on-demand application resource allocation. In accordance with the method of the invention, an anticipated workload can be compared to a measured capacity for an application cluster in one or more server computing nodes in a server farm. If the measured capacity warrants a re-configuration of the application clusters, a new placement can be computed for application server instances in individual ones of the server computing nodes. Subsequently, the new placement can be applied to the server computing nodes in the server farm.

In this regard, the applying step can include starting and stopping selected ones of the application server instances in different ones of the server computing nodes to effectuate the new placement. Notably, either or both of the computing and applying steps can be limited based upon the terms of a placement policy. For instance, either or both of the computing and the applying steps can be limited to ensure the application of no more than one change to any of the server computing nodes at any one time.

Significantly, in a preferred aspect of the invention, either or both of the computing and the applying steps can be limited to ensure that a total number of application server instances in an application cluster is at least a specified minimum value. Also, either or both of the computing and the applying steps can be limited to ensure that a total number of application server instances in an application cluster does not exceed a specified maximum value. Finally, either or both of the computing and the applying steps can be limited to ensure that a placement for a manually designated cluster is not changed.

An on-demand application resource allocation system which has been configured in accordance with the present invention can include one or more server computing nodes configured to host a plurality of application clusters having one or more application server instances. The system also can include at least one request router coupled to the server computing nodes. The system yet further can include a placement executor communicatively linked to the application server instances and programmed to apply a desired placement by starting and stopping selected ones of the application server instances. Finally, the system can include a placement controller programmed to generate the desired placement. Optionally, the system can include each of an application workload predictor and an application profile configured to produce a workload prediction and a set of application resource requirements utilized by the placement controller to generate the desired placement.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for on-demand resource allocation by dynamically reconfiguring the size and placement of application clusters. In accordance with the present invention, enterprise applications can be mapped to application clusters which are collections of application server instances, each executing the same application or set of applications on one or more nodes in a server farm. Multiple application server instances can be hosted in the same node. The dynamic provisioning can be realized by changing the size and placement of application clusters based upon the fluctuating workload produced by all applications. Specifically, a controlling mechanism in the system of the invention can both start and stop application server instances depending upon workload predictions and application resource requirements determined by the system.

More specifically, an application server instance in a stopped state consumes neither memory nor processing cycles in a host server computing device. To that end, the system of the invention can occasionally adjust which application servers instances are running and which are not, thus indirectly adjusting both the computational load on the nodes that host the application server instances and the computing power available in the various application clusters. Subsequently, when an experienced application workload increases, the system can extend an application cluster by starting a new application server instance on one or more host server computing devices. Conversely, when the experienced workload decreases, the system can stop one more application server instances executing the application. Finally, the system allows an application to be moved to a more suitable server computing device, given server capabilities and the workloads of other applications.

Figure 1:
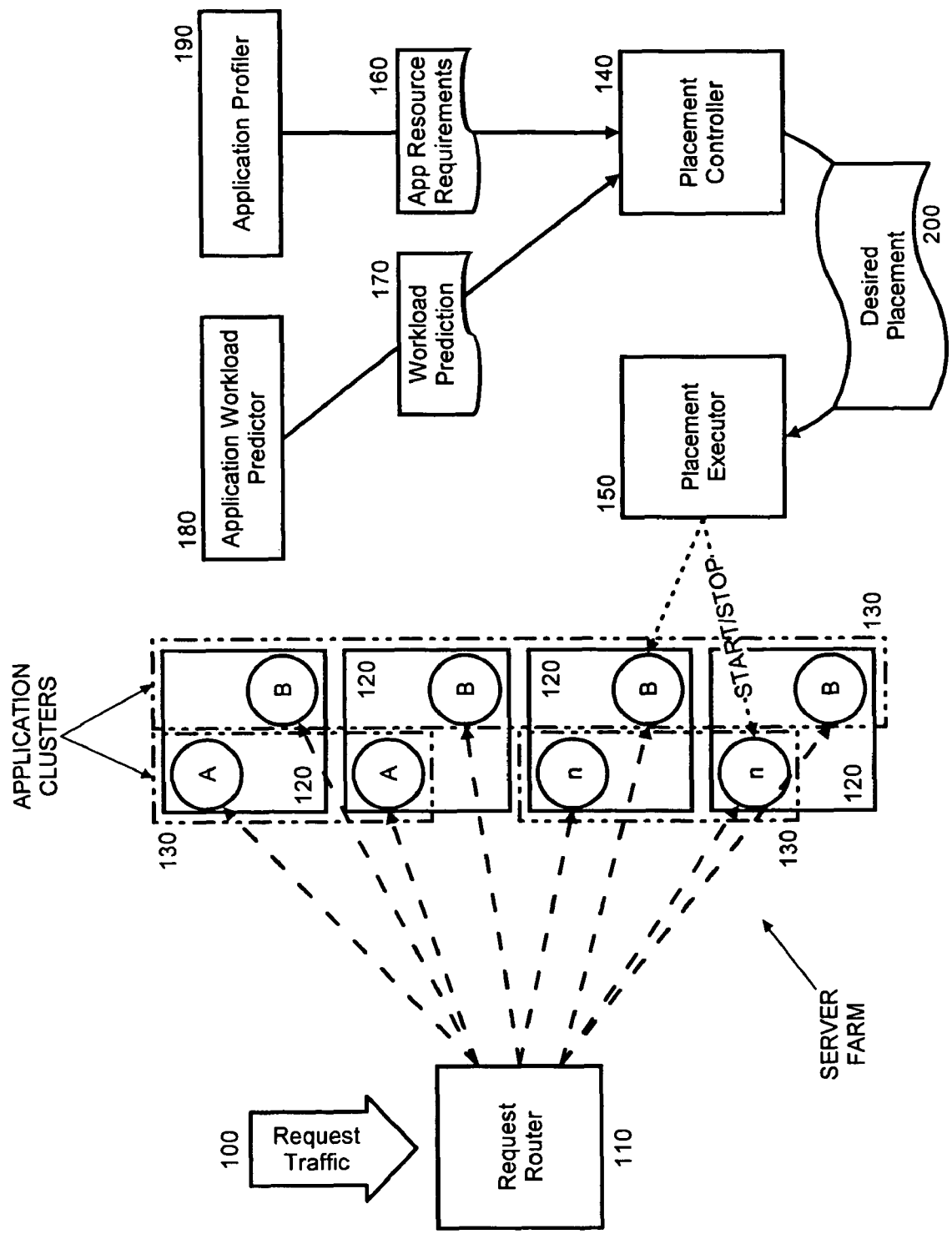
FIG. 1 is a schematic illustration of a server farm configured for on-demand application resource allocation by dynamically reconfiguring the size and placement of application clusters; and, FIG. 2 is a flow chart illustrating a process for on-demand application resource allocation by dynamically reconfiguring the size and placement of application clusters.

In more particular illustration, FIG. 1 is a schematic illustration of a server farm configured for on-demand application resource allocation by dynamically reconfiguring the size and placement of application clusters. The system of the invention can include one or more server computing nodes 120 arranged in a server farm serviced by a request router 110. Each server computing node 120 can host one or more application server instances A, B, n, which can be arranged in one or more application clusters 130. In this way, the request router 110 can route request traffic 100 to selected application clusters 130 in order to properly load balance the execution of applications in the selected application clusters 130.

Importantly, the server farm can be configured to support on-demand application resource allocation by dynamically reconfiguring the size and placement of the application clusters 130 among the server computing nodes 120. Specifically, a placement executor 150 and a placement controller 140 can be included in as an application co-located in one of the server computing nodes 120. Moreover, an application workload predictor 180 and an application profiler 190 can be included in the system. The application workload predictor 180 can utilize historical information regarding an offered load to produce a workload prediction 170 for a future workload for each application supported by the server computing device nodes 120 in the server farm. For instance, the workload prediction 170 can be characterized by the expected arrival rate of requests to a given application.

Similar to the application workload predictor 180, the application profiler 190 can produce a set of application resource requirements 160 by estimating the amount of server resources required by a single request of each application. The application resource requirements 160 can include, as an example, a number of consumed CPU cycles required to process a request. Furthermore, the application resource requirements 160 can include as yet a further example, an amount of memory required to process a request.

The placement controller 140 can utilize the workload prediction 170 and the application resource requirements 160 provided by the application workload predictor 180 and the application profiler 190 to compute the expected resource requirements for each application. Considering each of the expected resource requirements for each application, the given capacities of each of the server computing nodes 120 in the server farm and the current application placement, the placement controller 140 can compute a desired placement of applications 200. In computing the desired placement of applications 200, the placement controller 140 can maximize the amount of resource requirements that can be satisfied using the new placement, while minimizing the number of placement changes. Subsequently, the placement executor 150 can apply the desired placement 200 by starting and stopping selected ones of the application server instances A, B, n in the application clusters 130.

As it will be recognized by the skilled artisan, in managing the dynamic placement of applications in the application clusters 130 of the server farm, resource requirements of applications are characterized and estimated. Specifically, application resource requirements are characterized using two values defining the application's load-independent and load-dependent demand. The load-independent demand refers to the amount of memory consumed by each single instance of an application server. The load-dependent demand refers to resources whose utilization varies with application workload, such as the CPU, and which is divided among all of the application server instances. Correspondingly, node capacities can be characterized by load-independent and load dependent capacity values.

Given the load-independent and load-dependent demand and capacity values, the placement controller 140 can solve a combinatorial packing which aims to maximize the total load-dependent demand of applications satisfied by the computed placement while satisfying load-independent and load-dependent capacity constraints. Yet, the placement controller 140 need not suggest a change to the placement of applications in the application clusters 130 of the server farm unless the contemporaneous placement is determined to be inadequate for the new demand. In that case, the placement controller 140 can aim to minimize the number of placement changes.

Notably, the placement controller 140 can aim to ensure that a total number of application server instances A, B, n in an application cluster 130 is at least a specified minimum value. Also, the placement controller 140 can aim to ensure that a total number of application server instances A, B, n in an application cluster 130 does not exceed a specified maximum value. Finally, the placement controller 140 can aim to ensure that a placement for a manually designated cluster is not changed.

Preferably, the placement executor 150 can introduce little disruption to the running applications in the server farm. For example, the placement executor 150 can apply the desired placement 200 while obeying several rules. First, the placement executor 150 can apply no more than one change to any server computing node 120 at any one time. Second, the total number of application servers available for use by an application cannot be permitted to drop below a defined minimum. Finally, when applying the desired placement 200, the placement executor 150 can strive to obey the load-independent capacity constraints each server computing node 120.

Figure 2:
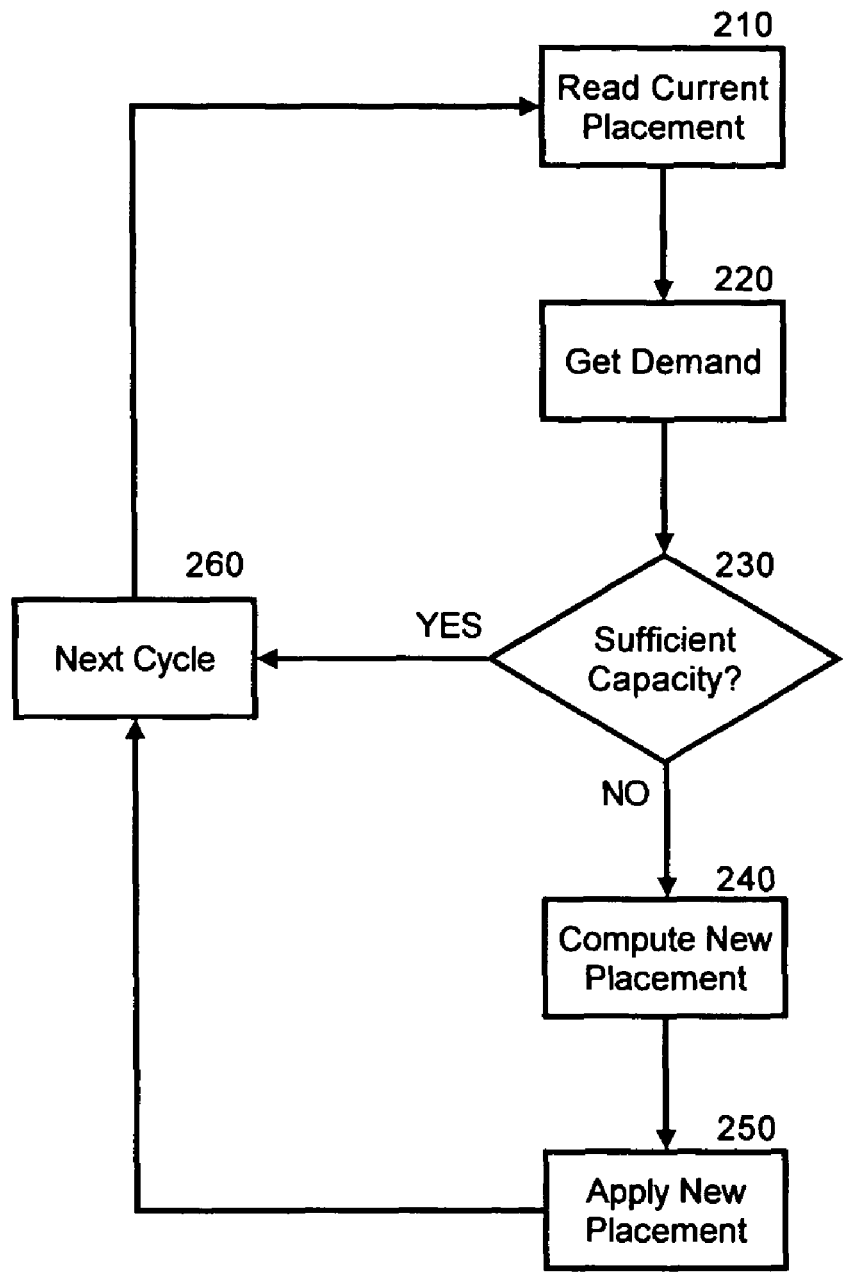

In more particular explanation, FIG. 2 is a flow chart illustrating a process for on-demand application resource allocation by dynamically reconfiguring the size and placement of application clusters. Beginning in block 210, a current placement can be determined for a set of application clusters in a server farm. In block 220, a load-dependent demand and a load independent demand can be determined. The load-dependent demand can reflect an observed request arrival rate. The observed values for the request arrival rate can be used to estimate a resource demand for each application. In the estimation process, the observed values can be smoothed to reduce the effects of workload variability when estimating the resource demand. In contrast, the load-independent demand can reflect an amount of memory dedicated to each application server without regard for the load it is serving.

In decision block 230, it can be determined whether the load-independent capacity and the load-dependent capacity can meet or exceed the load-independent demand and the load-dependent demand, considering the placement policy. If it is determined that a change to the current placement is not warranted, the process can move to the next cycle in block 260 and the process can repeat through block 210. Otherwise, in block 240 a new placement can be computed that satisfies the new demand and which is as close as possible to the current placement. In block 250 the new placement can be applied and the process can move to the next cycle in block 260 and the process can repeat through block 210.

Compared to conventional server farm management techniques, the system, method and apparatus of the present invention can achieve fine granularity of resource allocation for an application. If an application cannot utilize the capacity of an entire server computing device, the spare capacity can be allocated to other applications. Unlike conventional techniques, however, the system, method and apparatus of the present invention allows a large number of applications to be provisioned on the same set of server computing devices by allowing each server computing device to execute a different set of applications. Finally, placement changes can be automatically recognized by the request router without end users gaining an awareness of the placement changes.

As a result, an application can execute in a server computing device only if the workload produced by the application is high enough. Thus, the process of extending or contracting an application cluster produces relatively low processing overhead, and therefore can be performed frequently allowing faster response to application workload changes. By dynamically re-provisioning applications among a static set of server computing devices, the invention allows more application workload to be served on a smaller set of resources compared to existing techniques.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for on-demand application resource allocation by dynamically reconfiguring the size and placement of application clusters, the method comprising:
    comparing an anticipated workload to a measured capacity for the application clusters in the server computing nodes in a server farm;
    upon a determination, based upon said comparing, to reconfigure the application clusters:
    computing a new placement for the application clusters in individual ones of said server computing nodes, and
    applying said new placement to said server computing nodes in said server farm; and limiting said computing based upon terms of a placement policy to ensure that a total number of application server instances in an application cluster is at least a specified minimum value, wherein
    a single type application server instance is assigned to each of the application clusters, and a single application cluster spans multiple of the server computing nodes.

2. The method of claim 1, wherein said comparing includes:
predicting a load-dependent demand;
additionally predicting a load-independent demand;
measuring a load-dependent capacity; and
additionally measuring a load-independent capacity.

3. The method of claim 1, further comprising repeating the comparing, computing and applying periodically for different anticipated workloads.

4. The method of claim 1, wherein said applying includes starting and stopping selected ones of said application server instances in different ones of said server computing nodes to effectuate said new placement.

5. The method of claim 1, wherein said limiting ensures that a placement for a manually designated cluster is not changed.

6. The method of claim 1, further comprising limiting said applying based upon the terms of a placement policy.

7. The method of claim 6, wherein said limiting ensures the application of no more than one change to any of said server computing nodes at any one time.

8. The method of claim 6, wherein said limiting ensures that a total number of application server instances in an application cluster is at least a specified minimum value.

9. The method of claim 6, wherein said limiting step comprises the step of limiting said applying is limited to obey load-independent capacity constraints known for each of said server computing nodes.

10. A method for on-demand application resource allocation by dynamically reconfiguring the size and placement of application clusters, the method comprising:
comparing an anticipated workload to a measured capacity for the application clusters in the server computing nodes in a server farm;
upon a determination, based upon said comparing, to reconfigure the application clusters:
computing a new placement for the application clusters in individual ones of said server computing nodes, and
applying said new placement to said server computing nodes in said server farm; and
limiting said computing based upon terms of a placement policy to ensure that a total number of application server instances in an application cluster is no more than a specified maximum value, wherein
a single type application server instance is assigned to each of the application clusters, and
a single application cluster spans multiple of the server computing nodes.

11. An on-demand application resource allocation system comprising:
a plurality of server computing nodes configured to host of application clusters comprising a plurality of application server instances;
at least one request router coupled to said server computing nodes;
an application workload predictor configured to produce a workload prediction;
an application profiler configured to produce a set of application resource requirements for the applications clusters;
a placement executor communicatively linked to said application server instances and configured, upon a determination, based upon the set of application resource requirements, to reconfigure the applications clusters, to
compute a new placement for the application clusters in individual ones of said server computing nodes, and apply the new placement by starting and stopping selected ones of said application server instances;
a placement controller programmed to compute the new placement based upon a specified placement policy to ensure that a total number of application server instances in an application cluster is no more than a specified maximum value, wherein
a single type application server instance is assigned to each of the application clusters, and a single application cluster spans multiple of the server computing nodes.

12. A machine readable storage having stored thereon a computer program for on-demand application resource allocation, the computer program comprising a routine set of instructions which when executed by a machine cause the machine to perform the steps of:
comparing an anticipated workload to a measured capacity for the application clusters in the server computing nodes in a server farm;
upon a determination, based upon the comparing, to reconfigure the application clusters:
computing a new placement for the application clusters in individual ones of said server computing nodes, and
applying said new placement to said server computing nodes in said server farm; and
limiting said computing based upon terms of a placement policy to ensure that a total number of application server instances in an application cluster is at least a specified minimum value, wherein
a single type application server instance is assigned to each of the application clusters, and
a single application cluster spans multiple of the server computing nodes.

13. The machine readable storage of claim 12, wherein said comparing includes:
predicting a load-dependent demand;
additionally predicting a load-independent demand;
measuring a load-dependent capacity; and
additionally measuring a load-independent capacity.

14. The machine readable storage of claim 12, further comprising
repeating the comparing, computing and applying periodically for different anticipated workloads.

15. The machine readable storage of claim 12, wherein said applying includes starting and stopping selected ones of said application server instances in different ones of said server computing nodes to effectuate said new placement.

16. The machine readable storage of claim 12, wherein said limiting ensures that a placement for a manually designated cluster is not changed.

17. The machine readable storage of claim 12, further comprising limiting said applying based upon the terms of a placement policy.

18. The machine readable storage of claim 17, wherein said limiting ensures the application of no more than one change to any of said server computing nodes at any one time.

19. The machine readable storage of claim 17, wherein said limiting ensures that a total number of application server instances in an application cluster is at least a specified minimum value.

20. The machine readable storage of claim 17, wherein said limiting step comprises the step of limiting said applying is limited to obey load-independent capacity constraints known for each of said server computing nodes.

21. A machine readable storage having stored thereon a computer program for on-demand application resource allocation, the computer program comprising a routine set of instructions which when executed by a machine cause the machine to perform the steps of:

comparing an anticipated workload to a measured capacity for the application clusters in the server computing nodes in a server farm;

upon a determination, based upon said comparing, to reconfigure the application clusters:

computing a new placement for the application clusters in individual ones of said server computing nodes, and applying said new placement to said server computing nodes in said server farm; and limiting said computing based upon terms of a placement policy to ensure that a total number of application server instances in an application cluster is no more than a specified maximum value, wherein a single type application server instance is assigned to each of the application clusters, and a single application cluster spans multiple of the server computing nodes.

* * * * *